(No Model.) 2 Sheets—Sheet 1.
C. A. MAURER.
STEAM ENGINE.
No. 603,384. Patented May 3, 1898.
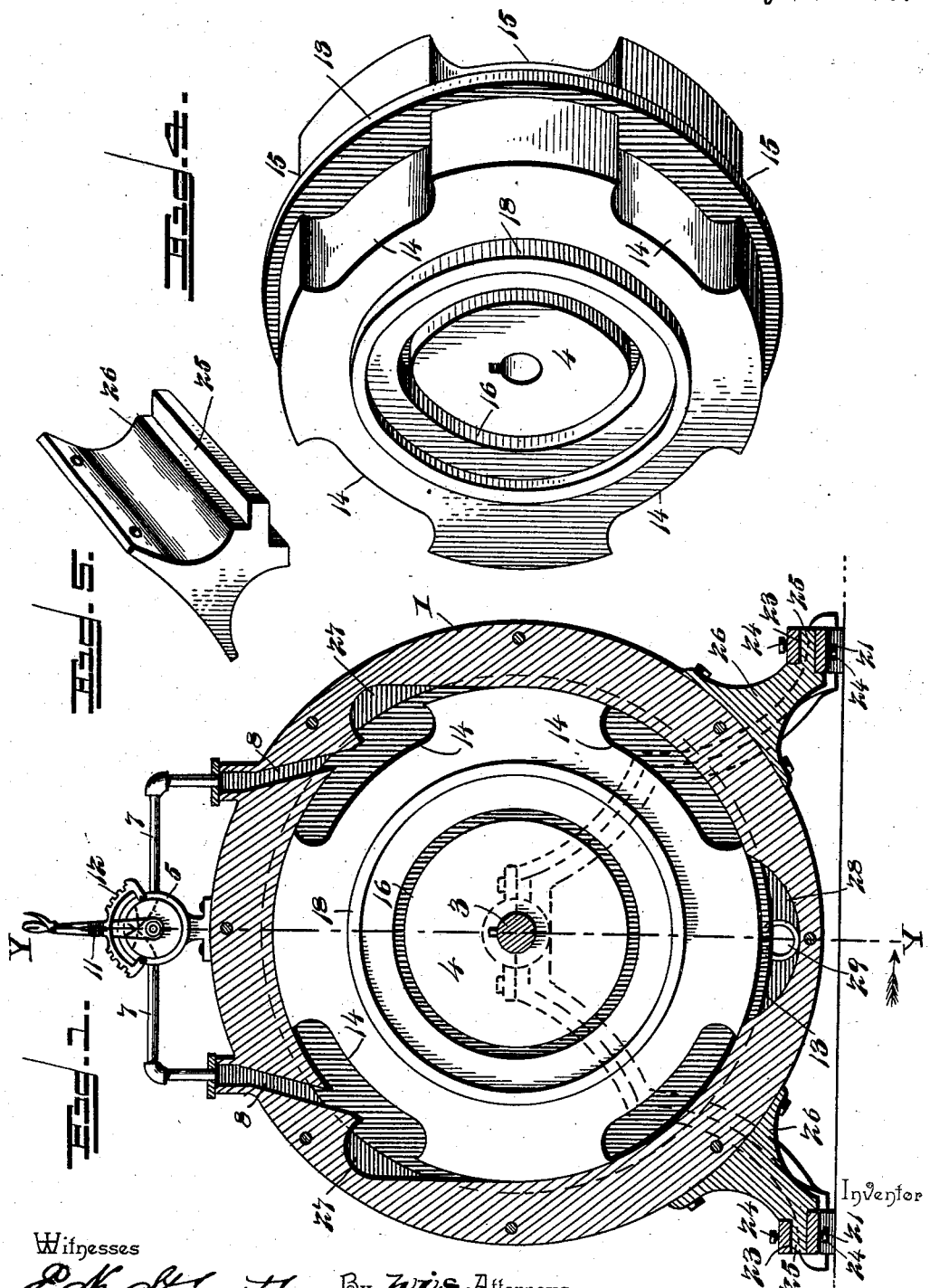
Witnesses
E. K. Stewart.
V. B. Hillyard.
Inventor
Charles A. Maurer
By his Attorneys,
C. A. Snow & Co.

(No Model.) 2 Sheets—Sheet 2.
C. A. MAURER.
STEAM ENGINE.
No. 603,384. Patented May 3, 1898.
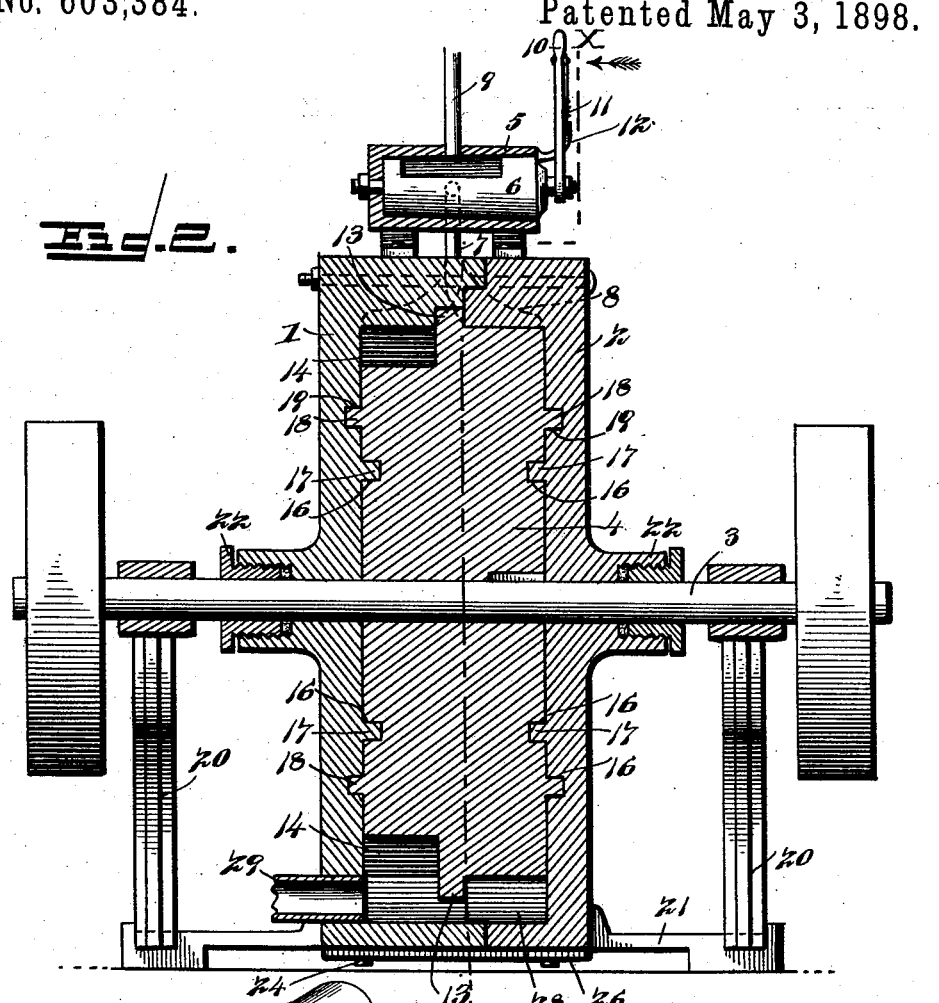
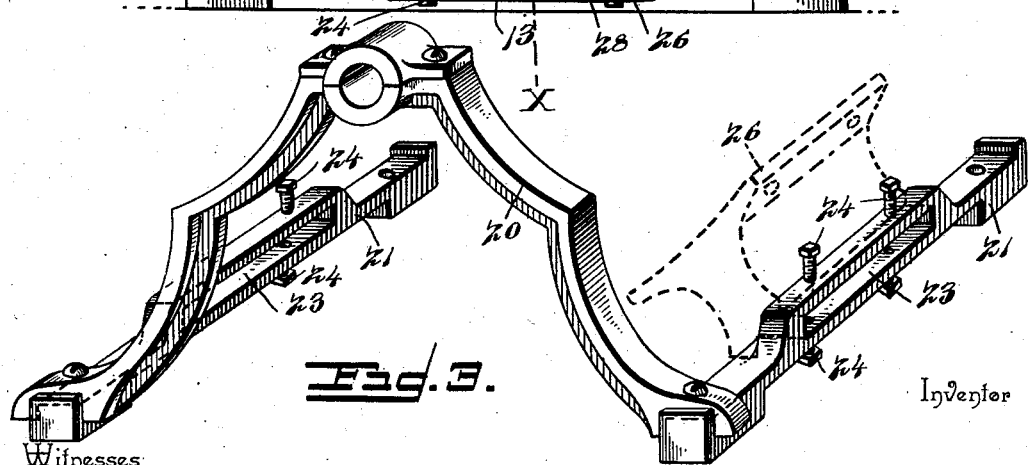
Witnesses
E. S. Stewart
V. B. Hillyard
Inventor
Charles A. Maurer
By his Attorneys,
C. A. Snow & Co.

UNITED STATES PATENT OFFICE.

CHARLES A. MAURER, OF CEDAR BLUFF, IOWA.

STEAM-ENGINE.

SPECIFICATION forming part of Letters Patent No. 603,384, dated May 3, 1898.

Application filed February 1, 1897. Serial No. 621,491. (No model.)

*To all whom it may concern:*

Be it known that I, CHARLES A. MAURER, a citizen of the United States, residing at Cedar Bluff, in the county of Cedar and State of Iowa, have invented a new and useful Steam-Engine, of which the following is a specification.

This invention relates to rotary steam-engines; and the primary object is to prevent the piston from stopping on a dead-center and to obviate binding of the shaft carrying the piston in the cylinder-heads.

A further purpose of the invention is to secure a steam-tight joint between the ends of the piston and the heads of the cylinder, and to utilize said means for centering the piston and maintaining it in a relatively fixed position without reference to the shaft upon which the piston is mounted.

Various other objects are contemplated and will appear in the course of the subjoined description, to which reference is to be had, in connection with the accompanying drawings, for a full understanding of the details.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a section on the line X X of Fig. 2, looking to the left as indicated by the arrow. Fig. 2 is a transverse section on the line Y Y of Fig. 1, looking in the direction designated by the arrow. Fig. 3 is a detail view in perspective of a bracket and the foot-bars coöperating therewith, the dotted lines showing the relation of a foot which is secured to the cylinder. Fig. 4 is a detail perspective view of the piston. Fig. 5 is a detail view of a foot.

Corresponding and like parts are referred to in the following description and indicated in the several views of the accompanying drawings by the same reference characters.

The cylinder is composed of similar parts 1 and 2, which are bolted or otherwise secured together and which have their inner or opposing ends halved or otherwise matched so as to secure an extended surface engagement between the meeting parts, whereby a steam-tight joint is more readily effected. Each part is composed of a head and a rim portion and is formed centrally with a bearing and stuffing-box for the shaft 3, the latter passing centrally through the cylinder and supporting the piston 4, which is secured thereto in any of the usual ways. A valve casing or chest 5 is mounted upon the cylinder and receives a valve 6, by means of which the steam is shut off or admitted to the cylinder through either the right or the left hand port, according to the direction in which it is required to drive the engine. Similar pipes 7 connect the steam chest or casing with oppositely-disposed ports 8 in the cylinder, whereby upon operating the valve 6 the steam may be admitted to either one of the ports for the purpose aforesaid. When one of the ports is open, the other is closed, and the valve can be turned so as to shut off the supply of steam from both ports. Steam is conveyed to the chest 5 by means of a pipe 9 from a suitable generator, and the valve 6 is operated by means of a lever 10, applied thereto, and is held in an adjusted position by means of a latch-bolt 11 and a notched segment 12, the latter being secured to the chest and the latch-bolt carried by the lever in the usual manner.

The piston 4 fits snugly between the heads of the cylinder and is formed with an annular rib 13, midway between its ends, which operates in a corresponding annular groove in the inner wall of the cylinder, as most clearly indicated in Fig. 2. A series of pockets 14 are formed in the periphery of the piston to one side of the annular rib 13, and a corresponding series of pockets 15 are provided in the periphery of the portion on the opposite side of the said annular rib, and the two sets of pockets are alternately disposed—that is, the pockets 14 come opposite the portions intermediate of the pockets 15 and the latter are arranged opposite the parts intermediate of the pockets 14, as most clearly indicated in Fig. 4. This disposition of the pockets precludes the possibility of the piston stopping on a dead-center from any cause and insures its starting upon admitting the steam to the cylinder through either port. The ends of the pockets are similarly formed and oppositely curved, forming shoulders or abutments to receive the impact of the motive medium, thereby admitting of the engine being driven in either direction, according to the inflow of steam. The abutments upon opposite sides of the rib 13 or medial line are alternately disposed, and each of the ports 8 communicates at its inner end with the cylinder upon opposite sides of the said medial line, so as to supply the motive medium to the sets of pockets upon opposite sides of the rib or medial line, whereby both sets of abutments receive alike the impact to drive the piston. The abutments or shoulders practically extend across the piston from side to side and are offset or stepped by reason of their alternate disposition, whereby the engine when running is under the influence of the steam at all times and a dead-center entirely obviated. The peculiar formation of the pockets with shoulders or abutments at each end admits of the piston being driven in either direction with the same force, as will be readily understood. An annular groove 16 is formed in each face or end of the piston and receives a corresponding rib 17, projecting from the inner face of the cylinder-heads, and concentric with the annular grooves 16 are formed ribs 18, which enter corresponding circular grooves 19 in the heads of the cylinder. These annular ribs 17 and 18 extend across the joint formed between the contiguous faces of the piston and heads of the cylinder and serve to maintain the piston in fixed relation to secure a steam-tight joint and to relieve the shaft 3 in a great measure of the weight of the piston.

Similar brackets 20 are located at the ends of the cylinder and form bearings for the shaft 3, and have their lower ends secured to foot-bars 21 in any substantial manner. The bearings provided at the upper ends of the brackets 20 aline with the stuffing-boxes and bearings 22, provided centrally of the cylinder-heads and serve in a measure to prevent binding of the shaft 3 in the parts 22. Each foot-bar 21 has a longitudinal slot 23 and binding-screws 24, the slot 23 receiving a tenon 25 of a foot 26, bolted or otherwise secured to a side of the cylinder, near its lower end, and the screws 24 engaging with the opposite sides of the tenon 25 to hold the latter within the slot 23. Shoulders are formed at the inner end of the tenon 25 to engage with the upper and lower portions of the foot-bar above and below the slot 23, thereby preventing any movement between the parts when assembled. The feet 26, foot-bars 21, and brackets 20 form, in effect, a stand for the engine and support the same when in operation, and are adjusted so as to hold the cylinder and piston in proper relation independently of the shaft, whereby easy running is secured and a wanton waste of energy obviated.

Chambers 27 are formed in the inner sides of the cylinder in advance of and adjacent to the ports 8, and their inner or rear ends curve inversely to the curved ends of the pockets 14 and 15, and their outer walls incline to the plane of the inner wall of the cylinder, as indicated most clearly in Fig. 1. These chambers 27 register with the pockets about the periphery of the piston and coöperate therewith to secure better results.

To the successful operation of the engine it is not essential that the expansion-chambers be provided, as it is obvious that they may be dispensed with. A chamber 28 is formed in the inner wall of the cylinder at the lowest point, and the exhaust-pipe 29 communicates therewith for carrying off the spent steam to a convenient point of discharge. The several pockets 14 and 15 have their end portions similarly formed, thereby adapting the engine to be driven in either direction, and the exhaust 29 being common to the pockets it is obvious that the engine may be caused to run in either direction by a proper manipulation of the valve 6, so as to admit the steam to the cylinder through the required port. The alternate relation of the pockets results in bringing one in position at all times and at every stage of movement of the wheel, so that the steam is applied to drive the engine continuously.

Having thus described the invention, what is claimed as new is—

1. In a rotary engine, the combination of a cylinder, a piston operating in the cylinder, means for admitting and exhausting a motive medium from the cylinder, brackets independent of each other and the cylinder and having the shaft of the piston journaled therein, foot-bars extending parallel with each other and the shaft of the piston and connecting the lower ends of the brackets, and provided with longitudinal slots, and feet secured to the sides of the cylinder and having their outer ends tenoned and secured in the slots of the foot-bars, and having shoulders above and below the tenons to engage with the inner sides of the foot-bars, substantially as shown and described.

2. A rotary engine constructed substantially as set forth, the same comprising a piston having a rib midway of its sides projecting beyond its peripheral surface, and having a corresponding number of similarly-formed pockets alternately disposed upon opposite sides of the rib, whereby the portions between the pockets upon one side of the rib come opposite and in transverse alinement with the pockets upon the other side of the said rib, the ends of the pockets being curved in opposite directions, forming shoulders or abutments, a cylinder composed of parts comprising heads having inner rims formed with a groove between their meeting portions to receive the aforesaid rib, and having oppositely-disposed inlet-ports and a chamber at its lowest point forming a common exhaust-port, and having chambers in advance of the inlet-ports with their inner ends inversely curved to the curved ends of the pockets, each port communicating with the cylinder upon opposite sides of the said groove and rib to supply the motive medium to the two sets of pockets; concentric grooves and ribs between the ends of the piston and the heads of the cylinder, and means for controlling the admission of steam to either of the inlet-ports, substantially as and for the purpose set forth.

In testimony that I claim the foregoing as my own I have hereto affixed my signature in the presence of two witnesses.

CHARLES A. MAURER.

Witnesses:
P. R. PINE,
M. R. JACKSON.